US009660228B2

(12) United States Patent
Kim

(10) Patent No.: US 9,660,228 B2
(45) Date of Patent: May 23, 2017

(54) SECONDARY BATTERY

(75) Inventor: Dae-Kyu Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 778 days.

(21) Appl. No.: 13/591,476

(22) Filed: Aug. 22, 2012

(65) Prior Publication Data

US 2013/0202923 A1   Aug. 8, 2013

(30) Foreign Application Priority Data

Feb. 3, 2012   (KR) .......................... 10-2012-0011171

(51) Int. Cl.
  *H01M 2/08*   (2006.01)
  *H01M 2/00*   (2006.01)
  *H01M 2/04*   (2006.01)
  *H01M 2/34*   (2006.01)
  *H01M 10/052*   (2010.01)

(52) U.S. Cl.
  CPC ........... *H01M 2/08* (2013.01); *H01M 2/0404* (2013.01); *H01M 2/345* (2013.01); *H01M 2/347* (2013.01); *H01M 10/052* (2013.01); *H01M 2200/00* (2013.01); *H01M 2200/106* (2013.01)

(58) Field of Classification Search
  None
  See application file for complete search history.

(56) References Cited

U.S. PATENT DOCUMENTS

| 5,707,756 | A | * | 1/1998 | Inoue et al. ................. 429/57 |
| 6,509,115 | B2 | * | 1/2003 | Kim .................... H01M 2/0473 |
| | | | | 429/163 |
| 6,620,544 | B1 | | 9/2003 | Shin et al. |
| 2005/0277023 | A1 | * | 12/2005 | Marple et al. ................. 429/221 |
| 2009/0061310 | A1 | * | 3/2009 | Kim .................... H01M 2/0413 |
| | | | | 429/185 |
| 2009/0148766 | A1 | | 6/2009 | Shen et al. |
| 2010/0310906 | A1 | | 12/2010 | Kim et al. |
| 2011/0076527 | A1 | * | 3/2011 | Kim et al. .................... 429/53 |
| 2011/0104523 | A1 | | 5/2011 | Lee et al. |
| 2011/0117423 | A1 | * | 5/2011 | Kim .................... H01M 2/0202 |
| | | | | 429/176 |

FOREIGN PATENT DOCUMENTS

| KR | 10-2006-0037832 | 5/2006 |
| KR | 10-2008-0075229 | 8/2008 |
| KR | 10-2010-0134511 | 12/2010 |

* cited by examiner

*Primary Examiner* — Barbara Gilliam
*Assistant Examiner* — Adam A Arciero
(74) *Attorney, Agent, or Firm* — Robert E. Bushnell, Esq.

(57) ABSTRACT

A secondary battery includes an electrode assembly, a case and a safety member. The electrode assembly has a first electrode plate, a second electrode plate and a separator interposed between the first and second electrode plates. The case accommodates the electrode assembly, and has an opened top. The safety member is inserted into an upper inside portion of the case, and seals the case. In the secondary battery, the safety member comprises an outer member contacting an inner surface of the case and having a center passing therethrough, an inner member spaced apart from the outer member at a predetermined interval and positioned at the center of the outer member, and a connection member connecting the outer and inner members. Accordingly, it is possible to increase the capacity of the battery.

14 Claims, 6 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 3 Feb. 2012 and there duly assigned Serial No. 10-2012-0011171.

BACKGROUND OF THE INVENTION

Field of the Invention

The present invention generally relates to a secondary battery.

Description of the Related Art

Recently, as demands on mobile devices increase with the development of technologies for the mobile device, demands on secondary batteries have rapidly increased. Applications of the secondary batteries are extended to not only digital devices such as a cellular phone, a notebook computer and a digital camera but also an electric-powered tool, an electric bike (e-bike), etc.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments provide a secondary battery capable of simplifying the structure of a cap assembly using a safety member with a structure capable of performing gas exhaustion and current cut-off functions at the same time.

According to an aspect of the present invention, there is provided a secondary battery including: an electrode assembly having a first electrode plate, a second electrode plate and a separator interposed between the first and second electrode plates; a case accommodating the electrode assembly and having an opened top; and a safety member inserted into an upper inside portion of the case, the safety member sealing the case, wherein the safety member includes an outer member contacting an inner surface of the case and having a center passing therethrough, an inner member spaced apart from the outer member at a predetermined interval and positioned at the center of the outer member, and a connection member connecting the outer and inner members.

The thickness of the connection member may be formed thinner than that of the outer or inner member.

The connection member may be formed to connect upper portions in the thickness direction of the outer and inner members.

The connection member may be formed to connect central portions in the thickness direction of the outer and inner members.

An insulation member may be further provided in a space between the outer and inner members.

The insulation member may be formed of a thermoplastic material.

The insulation member may be formed of a polybutylene terephthalate (PBT) resin.

The sides in the thickness direction of the outer and inner members, opposite to each other, may be formed to be inclined.

The outer and inner members may be formed to be downwardly inclined toward each other.

The side in the thickness direction of the outer member facing the inner member may be formed in a step shape.

The connection member may be formed of copper (Cu) or aluminum (Al).

The outer member, the inner member and the connection member may be integrally formed.

A cap-up may be further provided above the safety member.

A positive temperature coefficient may be further provided between the cap-up and the safety member.

According to the present invention, the structure of a cap assembly is simplified by a safety member with a structure capable of performing gas exhaustion and current cut-off functions at the same time, so that it is possible to reduce the volume of the cap assembly occupied in the secondary battery, thereby increasing the capacity of the secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
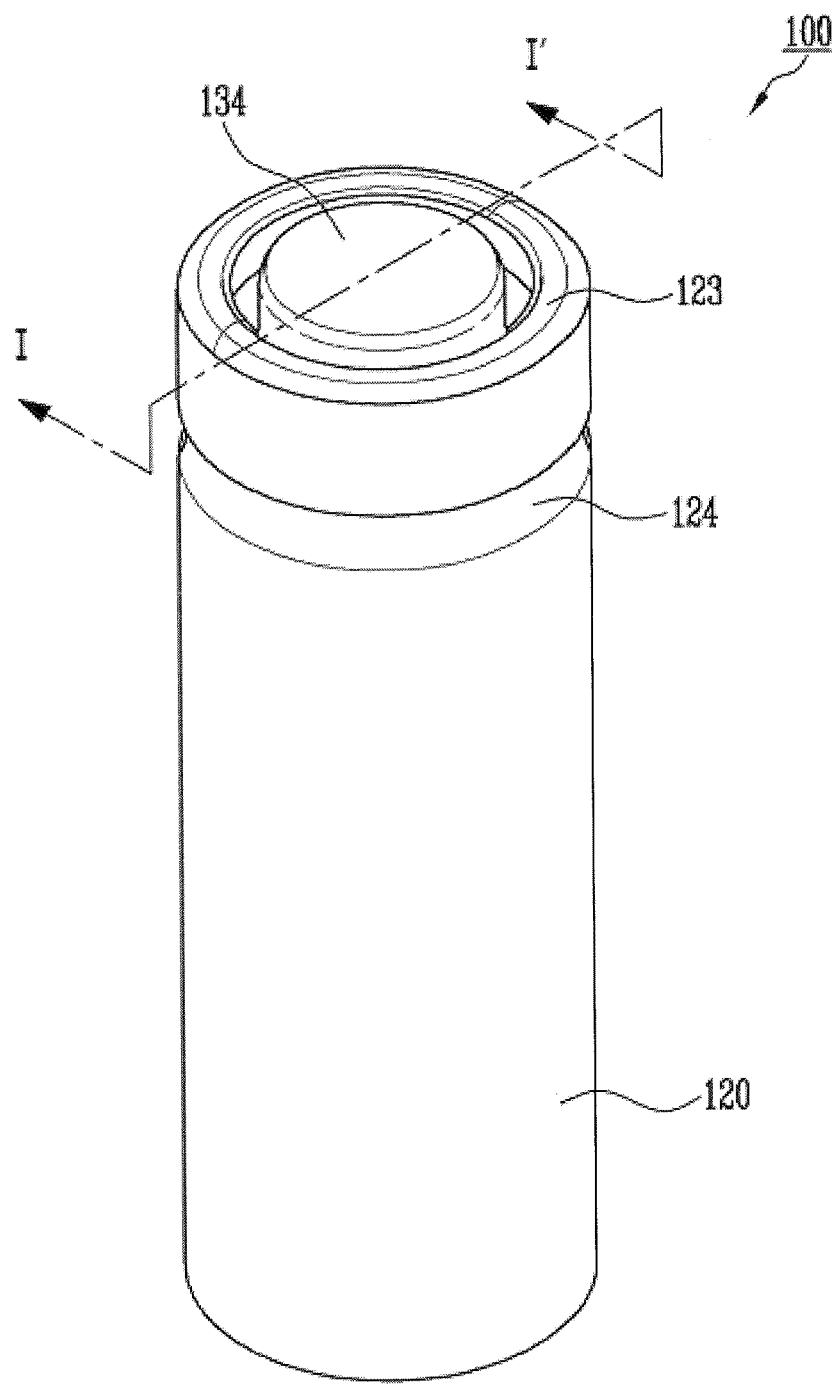
FIG. 1 is a perspective view showing a cylinder-type lithium secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on an another element or be indirectly on the another element with one or more intervening elements interposed therebetween. Also, when an element is referred to as being "connected to" another element, it can be directly connected to an another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Secondary batteries are generally classified into a cylinder-type battery, a prism-type battery and a pouch-type battery according to their external and internal structural features. In addition, electrode assemblies are roughly divided into a jelly-roll type electrode assembly and a stack-type electrode assembly according to their structures including positive electrodes, separators and negative electrodes, which constitute the secondary batteries.

An electrode active material is coated on a metal foil used as a collector, and the metal foil having the electrode active material coated thereon is dried and pressed. Then, the metal foil is cut to have a shape with a certain width and length. Subsequently, a separator is interposed between positive and negative electrode plates, and these plates are then wound in a spiral shape, thereby manufacturing a jelly-roll type electrode assembly. The jelly-roll type electrode assembly is frequently used for the cylinder-type battery, and may be applied to the prism-type or pouch-type battery by pressing the electrode assembly in a plate shape as occasion demands.

Generally, a cylinder-type secondary battery is manufactured by inserting a jelly-roll type electrode assembly into a cylinder-type case, positioning a cap assembly on an upper portion of the case and then crimping the top of the case. In this case, the cap assembly includes various components such as a vent, an insulation member, a cap-down, a sub-plate and a cap-up.

Figure 2:
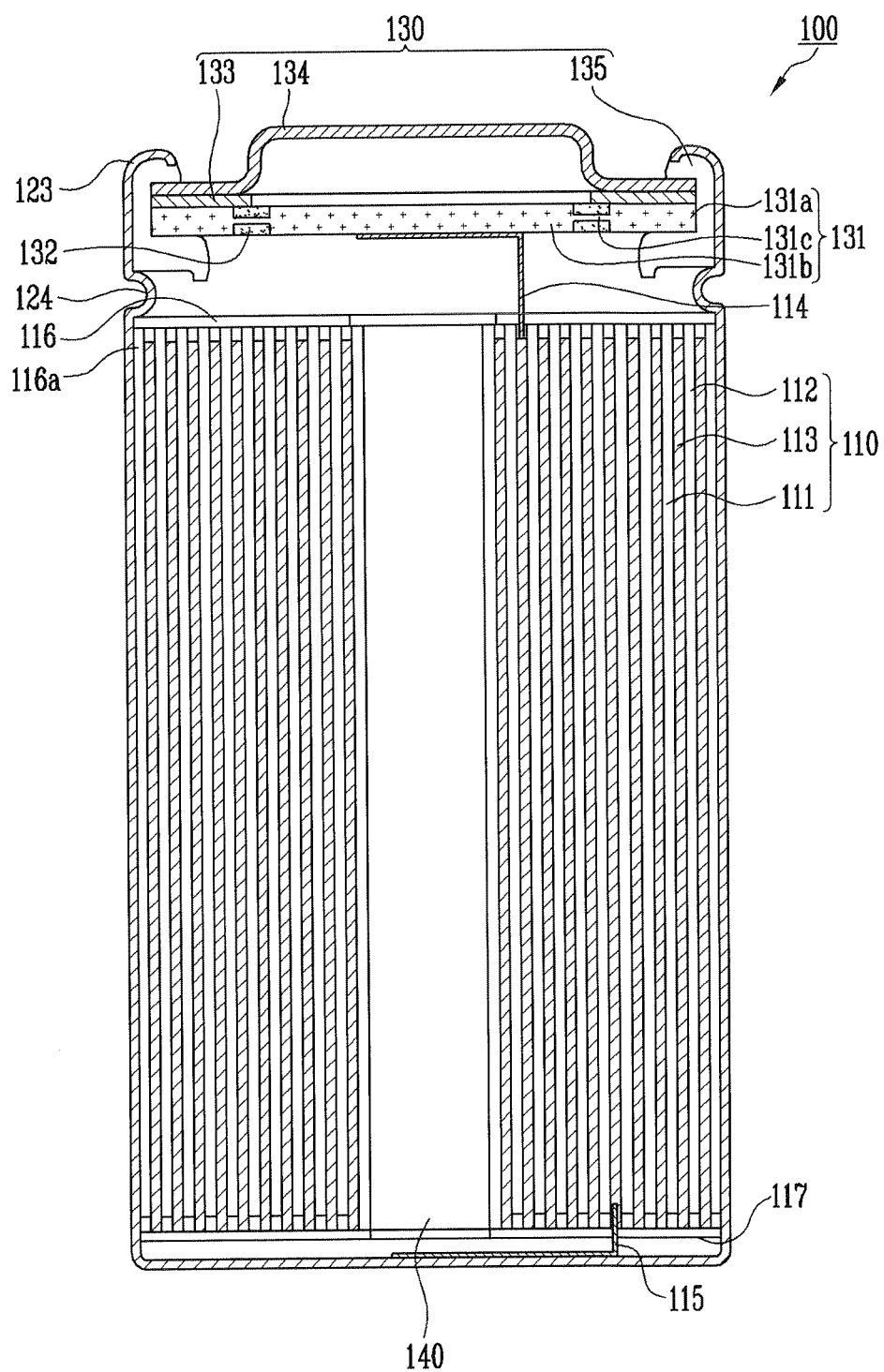
FIG. 2 is a sectional view taken along line I-I' of FIG. 1.

FIG. 1 is a perspective view showing a cylinder-type lithium secondary battery according to an embodiment of the present invention. FIG. 2 is a sectional view taken along line I-I' of FIG. 1.

Referring to FIGS. 1 and 2, the cylinder-type lithium secondary battery 100 according to this embodiment includes an electrode assembly 110 generating a voltage difference in charging/discharging thereof, a case 20 accommodating the electrode assembly 110, a safety member 131 assembled at an upper portion of the case 20 so as to allow the electrode assembly to come off from the case 20, and an electrolyte 140 injected into the case 120 so as to enable movements of lithium ions in the electrode assembly 120.

Here, the safety member 131 may perform functions a vent, an insulator, a cap-down and a sub-plate, which may be positioned at the upper portion of a case of a general cylinder-type secondary battery. The safety member 131 includes an outer member 131a contacting an inner surface of the case 120 and having a center passing therethrough, an inner member 131b spaced apart from the outer member 131a at a predetermined interval and positioned at the center of the outer member 131a, and a connection member 131c connecting the outer and inner members 131a and 131b. A cap-up 134 may be formed above the safety member 131, and a positive temperature coefficient 133 may be formed between the cap-up 134 and the safety member 131.

The outer member 131a, inner member 131b and connection member 131c of the safety member 131 are integrally formed, and may be formed of the same material. The outer member 131a, the inner member 131b and the connection member 131c may be formed of copper Cu or nickel Ni.

The electrode assembly 110 includes a positive electrode plate 111, a negative electrode plate 112, and a separator interposed between the positive and negative electrode plates 111 and 112 so as to prevent a short circuit and enable only movements of the lithium ions. In this case, a positive electrode active material made of a transition metal oxide such as $LiCoO_2$, $LiNiO_2$ or $LiMn_2O_4$ is coated on the positive electrode plate 111 a, and negative electrode active material such as graphite or carbon may be coated on the negative electrode plate 112. The positive and negative electrode plates 111 and 112 are wound in an approximately jelly-roll shape so as to be accommodated in the case 120.

The positive electrode plate 111 may be an aluminum foil, the negative electrode plate 112 may be a copper foil, and the separator may be polyethylene or polypropylene. However, the present invention is not limited thereto. A positive electrode tab 114 extended to protrude, to a predetermined length, to the top of the case 120 may be welded to the positive electrode plate 111, and a negative electrode tab 115 extended to protrude, to a predetermined length, to the bottom of the case 120 may be welded to the negative electrode plate 112. However, it will be apparent that the positive and negative electrode tabs 111 and 112 may be formed at lower and upper portions of the case 120, respectively. The positive electrode tab 114 may be formed of an aluminum (Al) material, and the negative electrode tab 115 may be formed of a nickel (Ni) material. However, the present invention is not limited thereto.

In the case 120 having an approximately cylinder shape, a cylindrical surface is formed to have a predetermined diameter, an approximately disk-shaped bottom surface may be formed at the bottom of the cylindrical surface, and the top of the cylindrical surface may be opened. Accordingly, the electrode assembly 110 can be inserted into the case 120 through the top of the cylindrical case 120. Here, the negative electrode tab 115 of the electrode assembly 110 may be welded to the bottom surface of the cylindrical case 120 so that the cylindrical case 120 can be operated as a negative electrode. It will be apparent that the positive electrode tab 114 may be welded to the bottom surface of the cylindrical case 120. In this case, the cylindrical case 120 can be operated as a positive electrode.

An upper insulation member 116 may be positioned on the top surface of the electrode assembly 110, and a lower insulation member 117 may be positioned on the bottom surface of the electrode assembly 110. Accordingly, it is possible to prevent an unnecessary electrical short circuit between the electrode assembly 110 and the cylindrical case 120. Although the cylindrical case 120 may be formed of steel, stainless steel, aluminum (Al) or equivalent thereof, the present invention is not limited thereto.

A crimping part 123 bent inward may be formed at a top end of the case 120. The crimping part 123 functions to press a cap assembly 130 subsequently coupled to the case 120. An inner protruding part 124 may be formed at a position corresponding to an upper circumferential surface of the electrode assembly 110 in the cylindrical case 120. The inner protruding part 124 functions to press the electrode assembly 110 in the direction from the top to the bottom so that the electrode assembly 110 does not come off to the upper portion of the case 120. In this case, the thickness of the inner protruding part 124 is preferable thicker than that of the cylindrical case 120 so that process safety is improved when the inner protruding part 124 is formed.

The crimping part 123 and the inner protruding part 124 function to firmly fix and support the cap assembly 130 to the cylindrical surface of the case 120 and to enable the electrolyte 140 not to be leaked from the case 120. The inner protruding part 124 can prevent the electrode assembly 110 from being moved in upper and lower directions.

The cap assembly 130 may be coupled to the upper portion of the cylindrical case 120, and includes the safety member 131, a circuit board (not shown), the positive temperature coefficient 133, the cap-up 134 and an insulative gasket 135. Here, the positive electrode tab 114 may be connected to the safety member 131. It will be apparent that the negative electrode tab 115 may be connected to the safety member 131. When the internal pressure of the case 120 increases, the safety member 131 may be deformed or broken to damage the circuit board positioned above the safety member 131 or to exhaust gas to the outside of the case 120. Accordingly, the circuit board is damaged, and current flowing in the circuit board.

The positive temperature coefficient 133 for interrupting the flow of current to the circuit board in overcurrent may be positioned on the circuit board. The conductive cap-up 134 may be positioned above the positive temperature coefficient 133. Here, the cap-up 134 provides a positive voltage (or negative voltage) to the outside, and has a plurality of through-holes formed to facilitate gas exhaustion. The region in which the safety member 131, the circuit board, the positive temperature coefficient 133 and the cap-up 134 come in contact with the case 120 may be surrounded by the insulative gasket 135, and thus a direct short circuit with the case 120 does not occur.

The electrolyte 140 serves as a movement medium for lithium ions generated through an electrochemical reaction at positive and negative electrodes in the battery during charge and discharge periods. The electrolyte 140 may be a non-aqueous organic electrolyte solution which may be a mixture of a lithium salt and a very pure organic solvent. In addition, the electrolyte 140 may be a polymer using a polymer electrolyte. However, the present invention is not limited to these types of electrolyte solution.

Figure 3A:
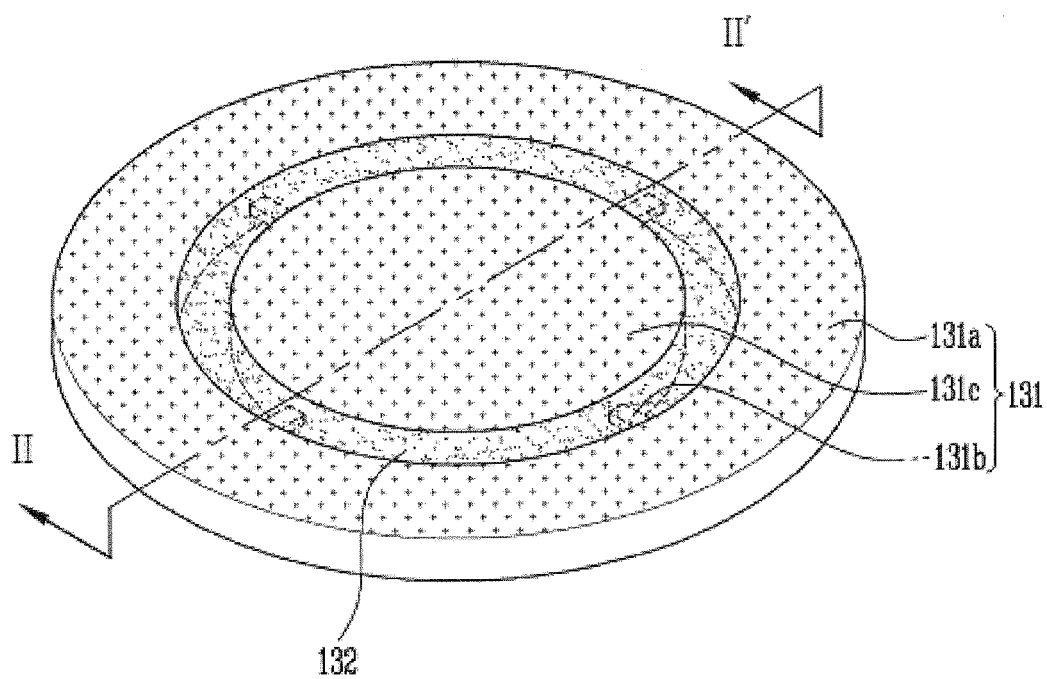
FIG. 3A is a perspective view showing a safety member according to the embodiment of the present invention.
Figure 3B:
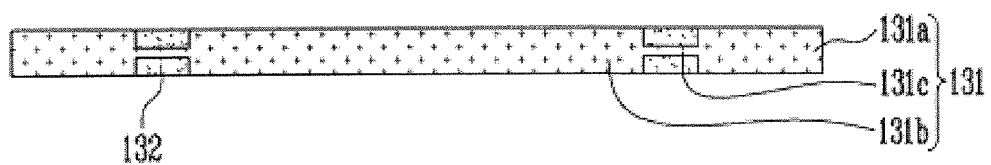
FIG. 3B is a sectional view taken along line II-II' of FIG. 3A.

FIG. 3A is a perspective view showing a safety member according to the embodiment of the present invention. FIG. 3B is a sectional view taken along line II-II' of FIG. 3A.

Referring to FIGS. 3A and 3B, the safety member 131 includes an outer member 131a contacting an inner surface of the case 120 (See FIG. 1) and having a center passing therethrough, an inner member 131b spaced apart from the outer member 131a at a predetermined interval and positioned at the center of the outer member 131a, and a connection member 131c connecting the outer and inner members 131a and 131b. Here, the thickness of the connection member 131c may be formed thinner than that of the outer or inner member 131a or 131b.

The connection member 131c may be formed to connect middle portions in the thickness direction of the outer and inner members 131a and 131b. As such, the connection member 131c may be formed at a middle portion in the thickness of the safety member 131, so that it is possible to improve the maintenance performance of the connection member 131c serving as a fuse. Insulation members 132 may be formed by being forcibly inserted into empty spaces formed at upper and lower portions of the connection member 131c, respectively. That is, the connection member 131c serving as a fuse that may be fractured depending on the internal pressure of the battery may be formed as an insertion type connection member.

The insulation member 132 may be formed of a thermoplastic material. Preferably, the insulation member 132 may be formed of a polybutylene terephthalate (PBT) resin. The PBT resin may be a polyester-based thermoplastic resin which is strongest against heat among thermoplastic resins and is not deformed even at 150° C. Accordingly, the insulation member 131 cannot be easily melted by heat generated from the electrolyte assembly.

The connection member 131c of the safety member 131 may be formed of copper (Cu) or aluminum (Al). The outer member 131a, the inner member 131b and the connection member 131c may be integrally formed.

The thickness of the safety member 131, which may be about 1 mm, can be formed thinner than that of existing conventional cap assemblies, which may be 1.75 mm. Thus, the volume of the cap assembly, occupied in the inside of the battery, is decreased, thereby increasing the capacity of the battery.

Figure 4A:
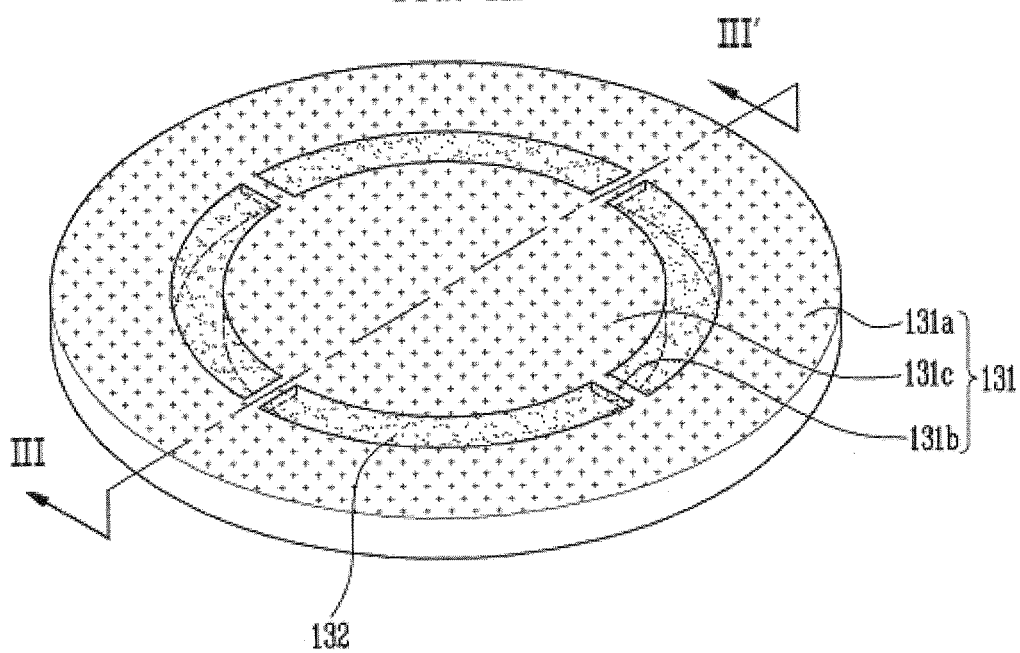
FIG. 4A is a perspective view showing a safety member according to another embodiment of the present invention.
Figure 4B:
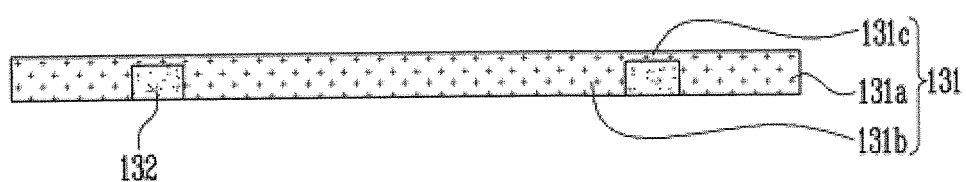
FIG. 4B is a sectional view taken along line III-III' of FIG. 4A.

FIG. 4A is a perspective view showing a safety member according to another embodiment of the present invention. FIG. 4B is a sectional view taken along line of FIG. 4A.

Referring to FIGS. 4A and 4B, the safety member 131 includes an outer member 131a contacting an inner surface of the case 120 (See FIG. 1) and having a center passing therethrough, an inner member 131b spaced apart from the outer member 131a at a predetermined interval and positioned at the center of the outer member 131a, and a connection member 131c connecting the outer and inner members 131a and 131b. Like the aforementioned embodiment, the thickness of the connection member 131c may be thinner than that of the outer or inner member 131a or 131b.

The connection member 131c may be formed to connect upper portions in the thickness direction of the outer and inner members 131a and 131b. Here, the connection member 131c may be formed at an upper portion in the thickness direction between the outer and inner members 131a and 131b, so that the connection member 131c can be fractured when the internal pressure of the battery is the maximum. An empty space may be formed beneath the connection member 131c, and an insulation member 132 may be positioned by being forcibly inserted into the space. That is, the connection member 131c serving as a fuse that may be fractured depending on the internal pressure of the battery may be formed as an external type connection member. Here, the operating pressure at which the flow of current is cut off by the internal pressure of the battery can be controlled by the thickness of the connection member 131c.

Figure 5A:
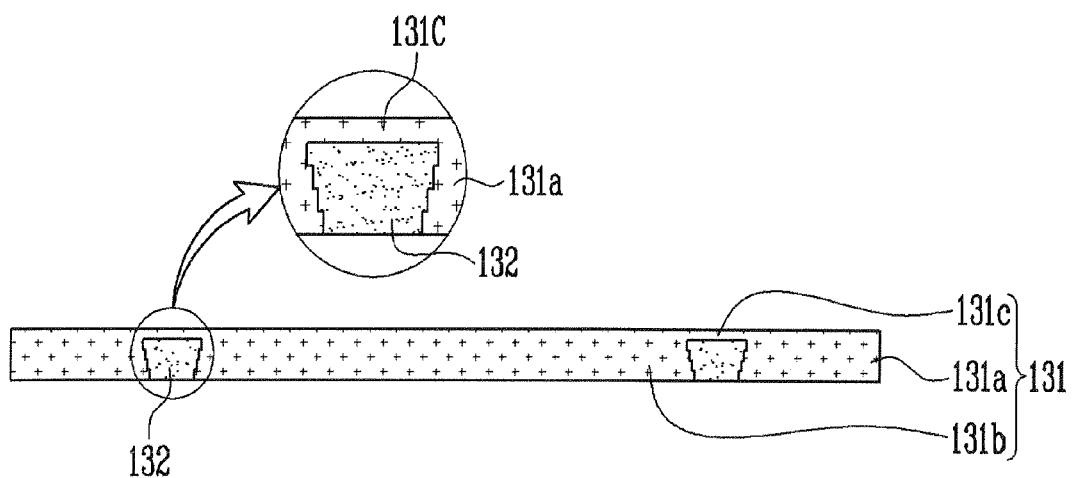
FIG. 5A is a sectional view showing an embodiment of the safety member according to the present invention.
Figure 5B:
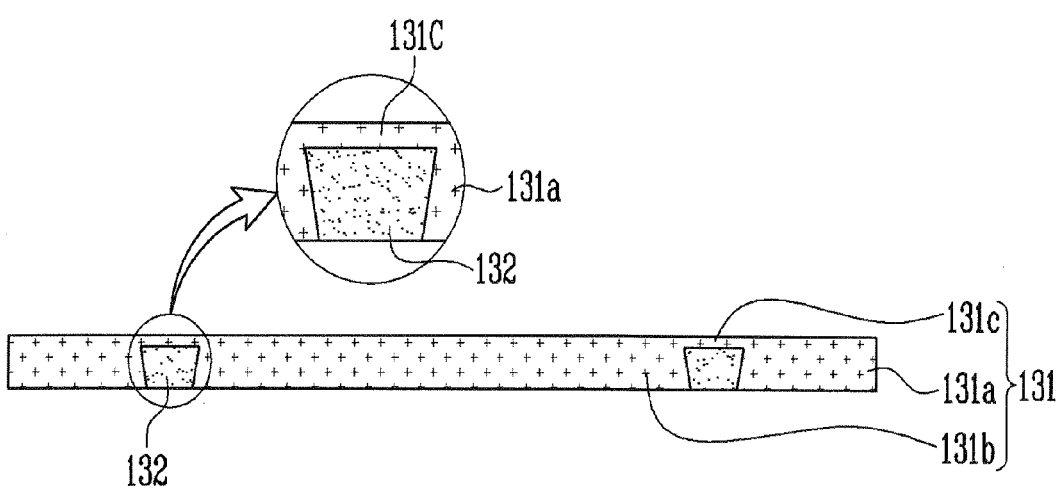
FIG. 5B is a sectional view showing another embodiment of the safety member according to the present invention.

FIG. 5A is a sectional view showing an embodiment of the safety member according to the present invention. FIG. 5B is a sectional view showing another embodiment of the safety member according to the present invention.

Referring to FIGS. 5A and 5B, the side in the thickness direction of each of the outer and inner members 131a and 131b of the safety member 131, opposite to each other, may be formed to be inclined.

In this case, the outer and inner members 131a and 131b may be downwardly inclined to have predetermined slopes toward each other (FIG. 5B). Alternatively, the outer and inner members 131a and 131b may be formed in step shapes downwardly inclined toward each other (FIG. 5A). The slopes of the sides of the outer and inner members 131a and 131b, opposite to each other, can control the fracture pressure at which gas is exhausted from the inside of the battery. As described above, the thickness of the connection member 131c in the safety member 131 is related to the operating pressure of the safety member 131, and accordingly, it is possible to control whether or not the flow of current is cut off.

Figure 6A:
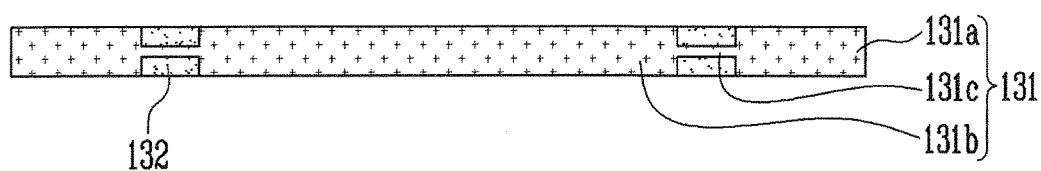
FIGS. 6A to 6C are sectional views illustrating a process of separating the safety member by applying pressure to the safety member according to the present invention.
Figure 6B:
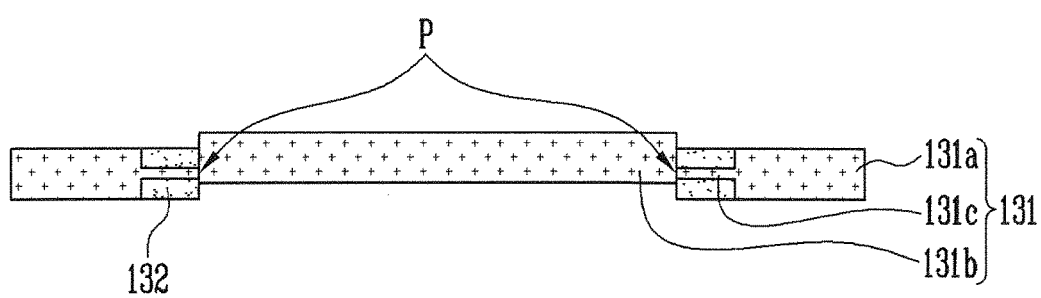
Figure 6C:
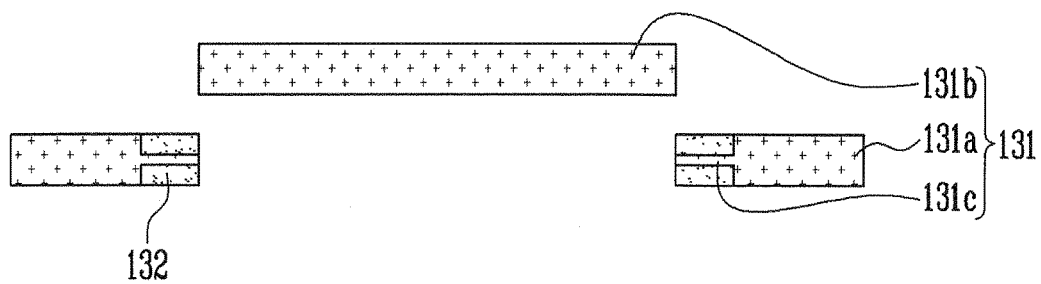

FIGS. 6A to 6C are sectional views illustrating a process of separating the safety member by applying pressure to the safety member according to the present invention.

Referring to FIGS. 6A to 6C, if the internal pressure of the battery 100 increases, the safety member 131 positioned at an upper portion of the case 120 (See FIG. 1) receives pressure applied upward. Particularly, the connection member 131 of which thickness may be relatively thinner than that of each of the outer and inner members 131*a* and 131*b* is mostly influenced by the internal pressure of the electrode assembly 110 (See FIG. 2).

If pressure is applied to the upside of the electrode assembly 110, at which the safety member 131, due to an increase in the internal pressure of the electrode assembly 110, a boundary portion P between the inner member 131*b* and the connection member 131*c* may be fractured. That is the connection member 131*c* serving as a fuse may be fractured by the internal pressure of the battery, and therefore, the flow of current in the battery is cut off due to the generation of an operating pressure. In this case, the operating pressure may be determined by the thickness of the connection member 131*c* (FIG. 6B).

Then, in the battery from which the current is cut off, the inner member 131*b* is completely separated from the connection member 131*c* by the continuously applied internal pressure of the battery. The fracture pressure may be determined by the shape of the sides of the outer and inner members 131*a* and 131*b*, opposite to each other, i.e., the slopes of the sides of the outer and inner members 131*a* and 131*b*, opposite to each other (FIG. 6C).

As described above, the volume of the cap assembly, occupied in the inside of the battery, is decreased by the safety member 131 with a structure capable of simultaneously performing gas exhaustion and current cut-off functions, thereby increasing the capacity of the battery.

Although the cylinder-type secondary battery has been described in the aforementioned embodiments, it will be apparent that the present invention may be applied to a prism-type secondary battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
an electrode assembly having a first electrode plate, a second electrode plate and a separator interposed between the first and second electrode plates;
a case accommodating the electrode assembly and an electrolyte having an opened top;
a cap assembly coupled to the opened end of the case to prevent electrolyte leakage, having a safety member, a positive temperature coefficient in direct physical contact with the safety member, a cap-up in direct physical contact with the positive temperature coefficient with the positive temperature coefficient sandwiched between the safety member and the cap-up, and an insulative gasket in direct physical contact with the safety member, the positive temperature coefficient, the cap-up, and the case,
wherein the safety member comprises:
an outer member contacting an inner surface of the case and having a center passing therethrough;
an inner member spaced apart from the outer member at a predetermined interval and positioned in the center of the outer member, said outer member entirely surrounds said inner member;
a connection member connecting the outer and inner members, said inner member and said outer member have no direct physical connect with each other; and
an insulation member is solely and exclusively located in a space between the outer and inner members,
wherein said insulation member, said connection member, said inner member and said outer member are positioned in a same geometric plane;
wherein said insulation member is in direct physical contact with the inner member, the outer member and the connection member,
wherein said insulation member entirely encapsulates said connection member with the exception of where the connection member is in direct contact with the inner and outer members, and
wherein said insulation member is composed of a different material from that of the inner member, the outer member and the connection member.

2. The secondary battery according to claim 1, wherein the thickness of the connection member is formed thinner than that of the outer or inner member.

3. The secondary battery according to claim 2, wherein the connection member is formed to connect upper portions in the thickness direction of the outer and inner members.

4. The secondary battery according to claim 2, wherein the connection member is formed to connect central portions in the thickness direction of the outer and inner members.

5. The secondary battery according to claim 2, wherein the insulation member is formed of a thermoplastic material.

6. The secondary battery according to claim 5, wherein the insulation member is formed of a polybutylene terephthalate (PBT) resin.

7. The secondary battery according to claim 1, wherein the connection member discontinuously connects the outer and inner members.

8. The secondary battery according to claim 1, wherein the connection member is a fuse fractured depending on the internal pressure of the battery.

9. The secondary battery according to claim 1, wherein the sides in the thickness direction of the outer and inner members, opposite to each other, are formed to be inclined.

10. The secondary battery according to claim 9, wherein the outer and inner members are formed to be downwardly inclined toward each other.

11. The secondary battery according to claim 10, wherein the side in the thickness direction of the outer member facing the inner member is formed in a step shape.

12. The secondary battery according to claim 1, wherein the connection member is formed of copper (Cu) or aluminum (Al).

13. The secondary battery according to claim 1, wherein the outer member, the inner member and the connection member are integrally formed.

14. The secondary battery according to claim 1, wherein the outer member, the inner member and the connection member are formed of copper (Cu) or nickel (Ni).

* * * * *